United States Patent
Ohtsuka

Patent Number: 5,828,916
Date of Patent: *Oct. 27, 1998

[54] CAMERA

[75] Inventor: Masanori Ohtsuka, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 910,388

[22] Filed: Aug. 13, 1997

Related U.S. Application Data

[63] Continuation of Ser. No. 546,723, Oct. 23, 1995, abandoned.

[30] Foreign Application Priority Data

Nov. 11, 1994 [JP] Japan .................................... 6-277875

[51] Int. Cl.⁶ .................................................. G03B 1/00
[52] U.S. Cl. .......................................... 396/408; 396/514
[58] Field of Search .................................... 396/406, 407, 396/408, 514, 515, 516

[56] References Cited

U.S. PATENT DOCUMENTS

| | | | |
|---|---|---|---|
| 5,032,854 | 7/1991 | Smart et al. | 354/21 |
| 5,283,604 | 2/1994 | Aoshima | 354/21 |
| 5,440,363 | 8/1995 | Minnick et al. | 354/21 |
| 5,483,310 | 1/1996 | Tanii et al. | 354/21 |
| 5,497,213 | 3/1996 | Yoshida et al. | 354/21 |
| 5,530,498 | 6/1996 | Miyazaki et al. | 354/21 |

OTHER PUBLICATIONS

Patent Abstracts of Japan No. JP7020526, (Canon Inc.), published Jan. 24, 1991, vol. 95, No. 4.

*Primary Examiner*—Safet Metjahic
*Assistant Examiner*—John Chizmar
*Attorney, Agent, or Firm*—Robin, Blecker & Daley

[57] ABSTRACT

In a camera of the kind setting information when a film cartridge is stowed in the camera by reading a pattern from a data disk disposed on the film cartridge, an information reading action on the pattern of the data disk is allowed to begin when a predetermined period of time has elapsed after the film cartridge is stowed in the camera, so that the information reading action can be prevented from being performed while the film cartridge is still vibrating due to the stowing action.

5 Claims, 8 Drawing Sheets

F I G. 4
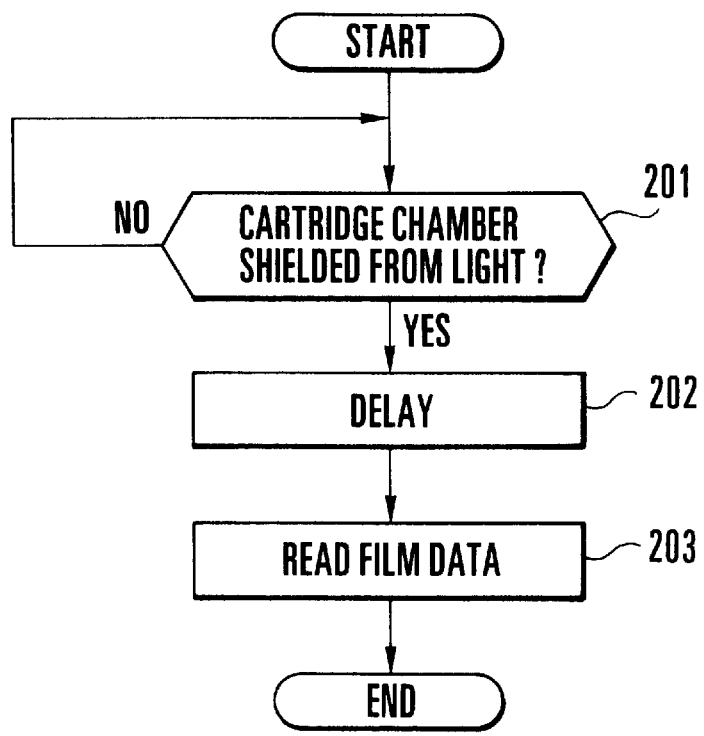

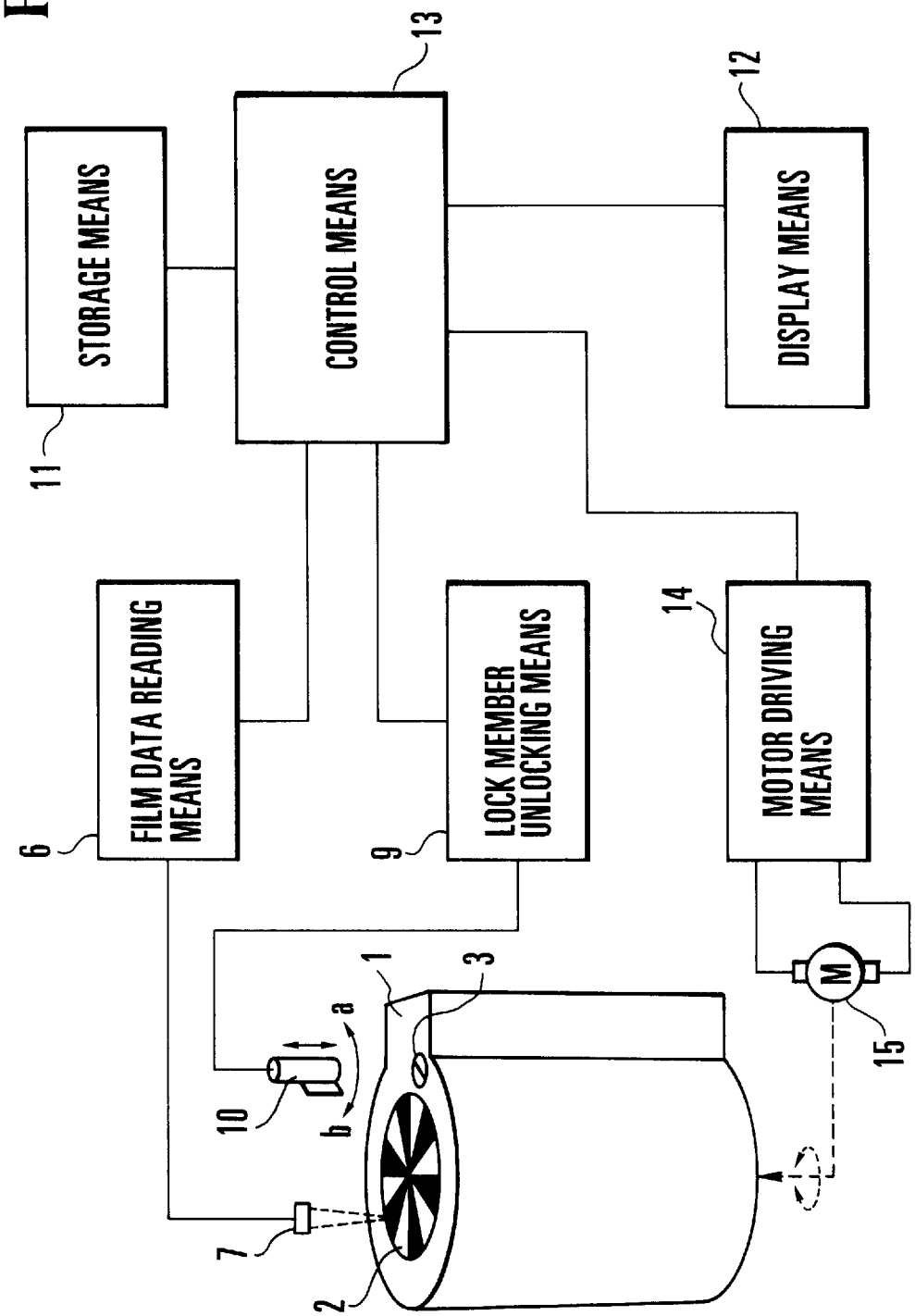

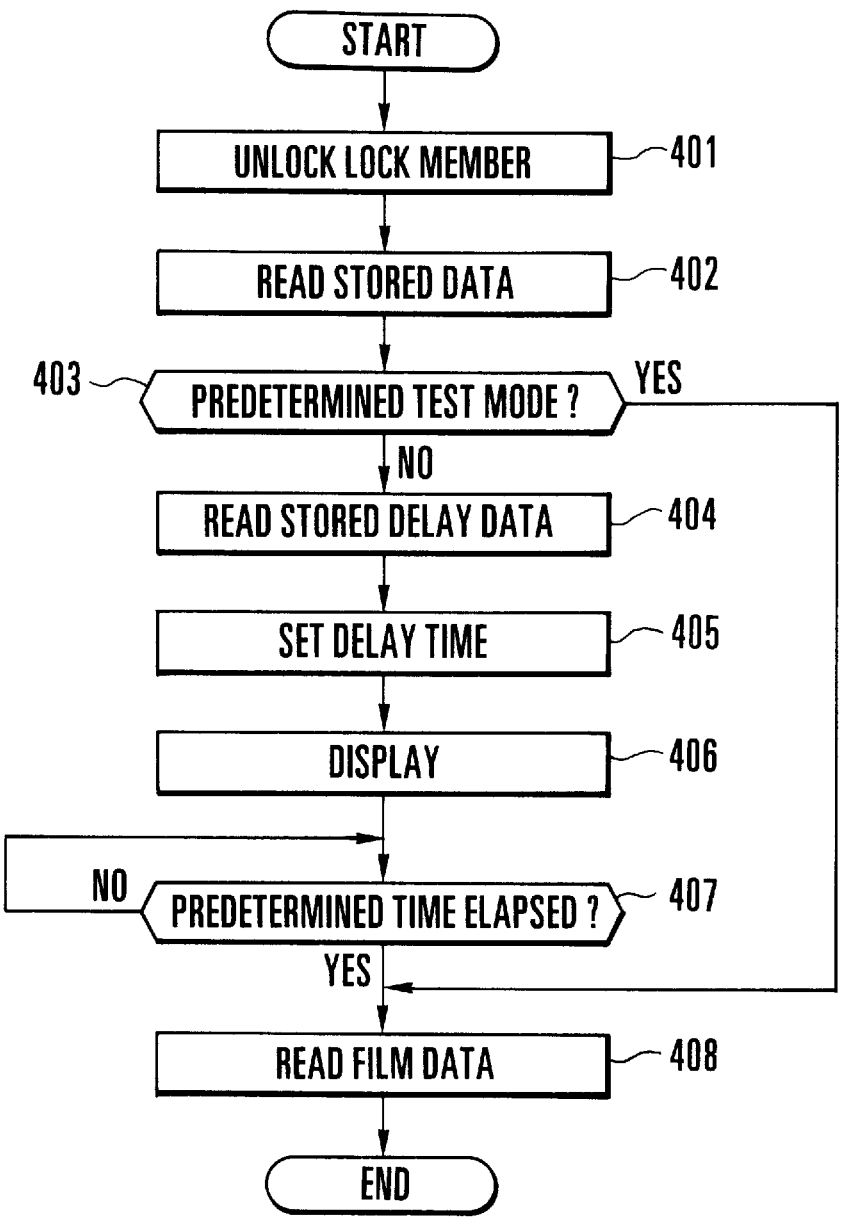

CAMERA

This is a continuation of prior application Ser. No. 08/546,723 filed on Oct. 23, 1995 abandoned.

BACKGROUND OF THE INVENTION

1. Field of the Invention

This invention relates to a film data reading method and a device for carrying out the method for reading information which is provided on a film cartridge and which is peculiar to a film contained in the film cartridge.

2. Description of the Related Art

A film cartridge on which there is provided information peculiar to a film contained in the film cartridge has been disclosed in U.S. Pat. No. 5,025,274.

The film cartridge is provided with a disk which is disposed perpendicular to the axis of rotation of the film cartridge and has information peculiar to a film contained in the film cartridge. Such information, which is coded in a pattern on the disk, can be read out through different reflection factors of the pattern found when the disk is rotated.

It is a great advantage of the film cartridge of this kind that information on film sensitivity, the number of frames of the film, the kind of the film, etc., can be read out for an apposite photographing operation by just causing a rotating shaft of the film cartridge to rotate in a direction reverse to the film sending direction of the cartridge.

SUMMARY OF THE INVENTION

It is one aspect of the invention under the present application to provide a film data reading method for stably and accurately reading data peculiar to a film contained in a film cartridge of the kind mentioned in the foregoing, in reading information on the film from a data disk provided on the film cartridge and also to provide a device for carrying out this method.

It is another aspect of the invention under the present application to provide a camera which is arranged to read information provided on the film cartridge of the above-stated kind after waiting for a lapse of a predetermined period of time from insertion of the film cartridge into the camera, in such a way as to secure a sufficient period of time for adjusting and correcting the inserted position of the film cartridge to an apposite position within the camera, so that the information can be accurately read without being affected by vibrations resulting from the film cartridge inserting and stowing action.

It is a further aspect of the invention under the present application to provide a camera arranged to begin to read information provided on the film cartridge of the above-stated kind when a predetermined period of time elapses after the film cartridge is stowed in a stowing chamber and the stowing chamber is shielded from light by a stowing chamber cover or the like, so that the camera can be prevented from being caused to inaccurately read the information by vibrations of the film cartridge.

It is a still further aspect of the invention under the present application to provide a camera having different modes of reading information provided on the film cartridge of the above-stated kind, including a mode in which the information is read after a lapse of the above-stated predetermined period of time and another mode in which the information is read without waiting for a lapse of the predetermined period of time, so that the latter mode can be selected for tests to be performed at a factory or the like.

These and other aspects and features of the invention will become apparent from the following detailed description of embodiments thereof taken in conjunction with the accompanying drawings.

BRIEF DESCRIPTION OF THE DRAWINGS

FIG. 4 is a flow chart showing the operation of the second embodiment shown in FIG. 3.

FIG. 7 is a block diagram of a film data reading device which is a fourth embodiment of the invention.

FIG. 8 is a flow chart showing the operation of the fourth embodiment shown in FIG. 7.

DETAILED DESCRIPTION OF THE PREFERRED EMBODIMENTS

Figure 1:
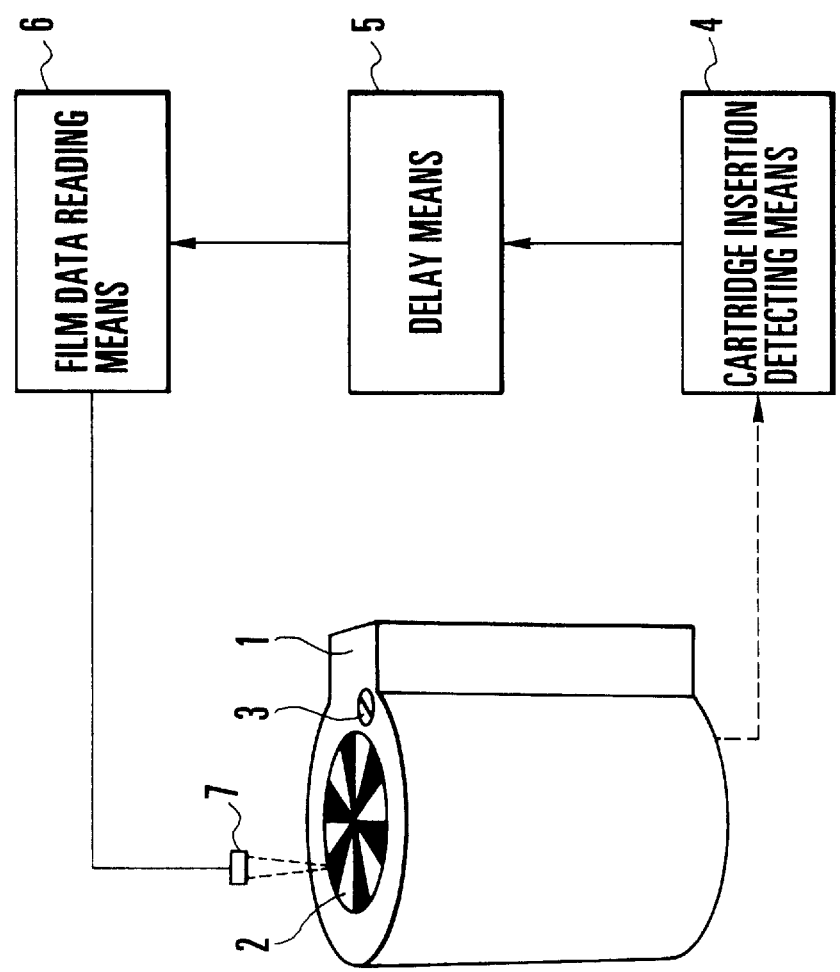
FIG. 1 is a block diagram of a film data reading device which is a first embodiment of the invention.

FIG. 1 shows in a block diagram the arrangement of a first embodiment of the invention. The illustration includes a film cartridge 1. A data disk 2 is disposed within the film cartridge 1 and is provided with a bright-and-dark pattern (bar-code pattern), which indicates the number of frames of a film, the kind of the film, the sensitivity of the film, etc. A lock member 3 is arranged to lock the data disk 2 to prevent the data disk 2 from accidentally moving. Cartridge insertion detecting means 4 is arranged to detect insertion of the film cartridge 1 into a film cartridge loading device which is not shown. The cartridge insertion detecting means 4 is, for example, composed of a switch which is arranged within a cartridge chamber to turn on when the film cartridge 1 is inserted. Delay means 5 is arranged to delay a next action for a predetermined period of time. Film data reading means 6 is arranged to receive, as a signal, a reflection light obtained by projecting a light onto the data disk 2 and to read data by the level of the reflection light signal. A detection element 7 is arranged to project a light onto a target such as a photo-resistor or the like and to receive a reflection light from the target.

The operation of the device arranged as shown in the block diagram described above is described below with reference to FIG. 2 which is a flow chart.

Figure 2:
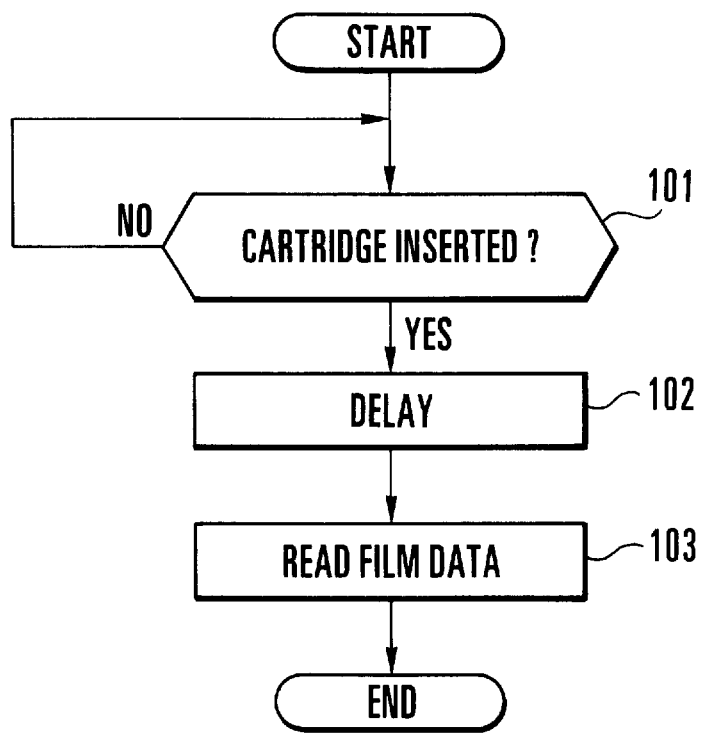
FIG. 2 is a flow chart showing the operation of the first embodiment shown in FIG. 1.

Referring to FIG. 2, at a step 101, the film cartridge insertion detecting means 4 detects insertion of the film cartridge 1 when the film cartridge 1 is inserted into a film cartridge loading device which is not shown. At a step 102, the delay means 5 counts time for a predetermined length of delay time after the insertion of the film cartridge is detected by the step 101. At a step 103, after a lapse of the delay time, film data is read. Further, when the insertion of the film cartridge 1 is detected by the step 101, a motor which is not shown is actuated to rotate the data disk 2 in a direction reverse to the direction in which the film is to be sent out from the film cartridge 1. Thus, at the step 103, the detection element 7 begins the light projecting and light receiving actions to detect the coded bright-and-dark pattern provided on the data disk 2, and the film data reading means 6 then reads a signal coming from the detection element 7.

In inserting the film cartridge 1, the above-stated arrangement and operation enable the embodiment to secure a sufficiently long period of time for correcting and adjusting the position of the film cartridge 1 to a predetermined position even in a case where the inserted position of the film cartridge 1 deviates from the correct position. Besides, a sufficient length of time necessary before the vibrations of the data disk come to an end in inserting the film cartridge 1 is also secured, so that the data can be stably and accurately read out from the data disk. The arrangement dispenses with a device for detecting vibrations and positional deviations and for deciding whether or not the vibrations and deviations have been corrected. The embodiment, therefore, has a great advantage in terms of a reduction in cost and space.

Further, while this particular embodiment is arranged to perform a sequence of hardware actions by the blocks of component parts, this invention is not limited to the arrangement described. According to the invention, the same advantageous effect can be attained by delaying and controlling the operation of each block through software actions of some suitable control means such as microcomputer or the like.

Figure 3:
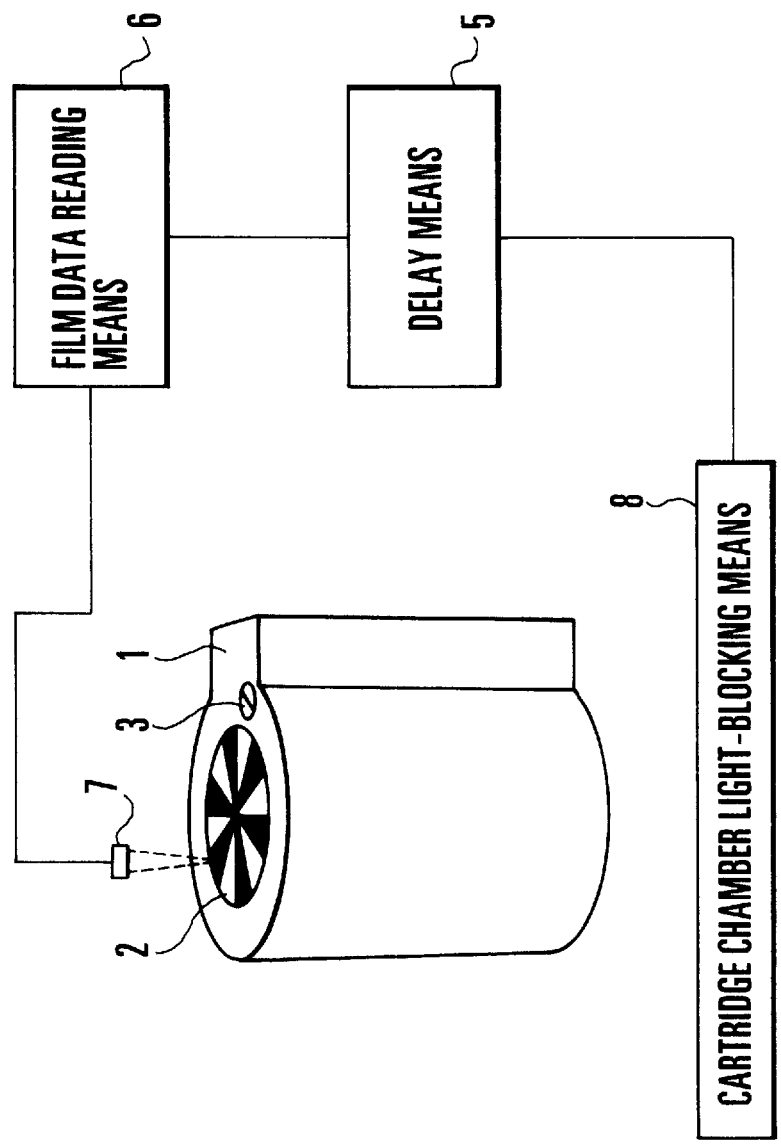
FIG. 3 is a block diagram of a film data reading device which is a second embodiment of the invention.

FIG. 3 is a block diagram showing a second embodiment of the invention. The illustration includes a film cartridge 1, a data disk 2 which is identical with the data disk of FIG. 1, a lock member 3 for the data disk 2, a cartridge chamber light-blocking means 8 arranged to shield from light a film cartridge chamber (not shown), for example, by closing a lid after the film cartridge 1 is inserted into the film cartridge chamber, a delay means 5 arranged to delay a next action for a predetermined period of time, a film data reading means 6, and a detection element 7 which is identical with the detection element of FIG. 1. The arrangement shown in the block diagram operates as described below with reference to FIG. 4.

Referring to FIG. 4 which is a flow chart, the film cartridge 1 is first inserted in a film cartridge chamber which is not shown. At a step 201, a check is made to find if the film cartridge chamber is shielded from light, for example, by closing the lid of the film cartridge chamber. At a step 202, a predetermined delay time is provided by the delay means 5 after the film cartridge chamber is shielded from light. At a step 203, film data is read. The film data may be read in any manner as desired. Further, the detection by the step 202 of the light-shielded state of the film cartridge chamber is made by a switch which is arranged to turn on when the film cartridge chamber is closed. With the light-shielded state detected, the data disk 2 is caused to rotate by a motor in the same manner as in the case of the first embodiment shown in FIG. 1.

With the second embodiment arranged and operating as described above, in reading data from the data disk 2, the data reading action is prevented from being affected by any external light incident on the detection element 7 as the film cartridge chamber is completely shielded from light. Further, the arrangement dispenses with any additional device that is arranged to detect whether or not the film cartridge chamber is completely shielded from light or any light blocking mechanism that blocks any external light even if the film cartridge chamber is not in a light-shielded state. This is a salient merit of the arrangement of the embodiment in terms of a reduction in cost and space.

Figure 5:
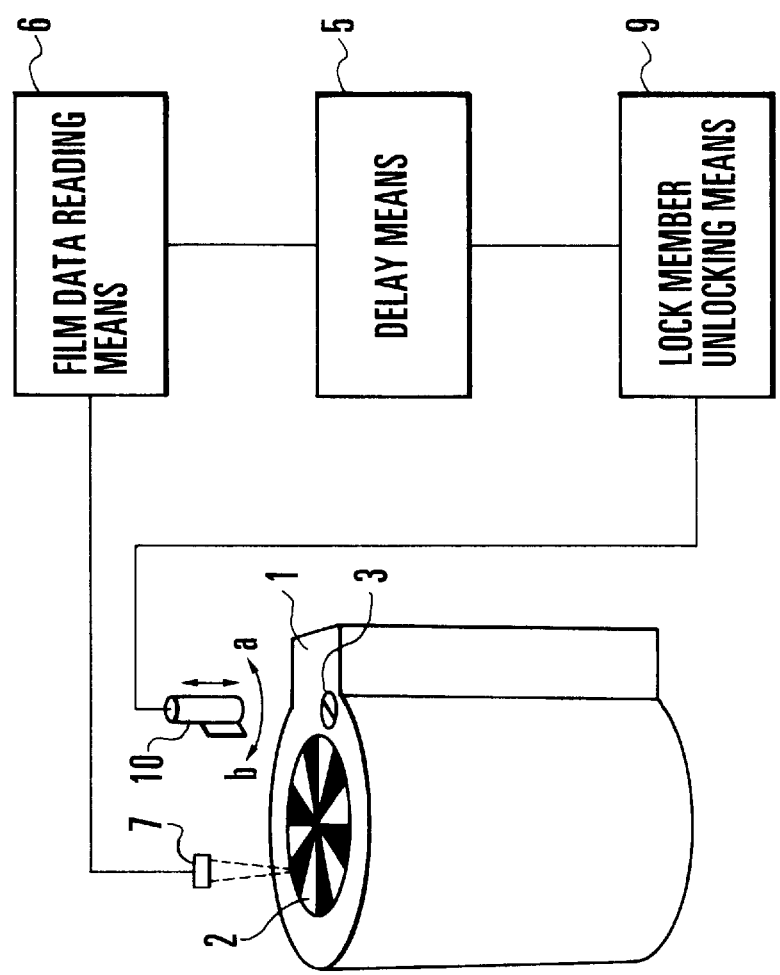
FIG. 5 is a block diagram of a film data reading device which is a third embodiment of the invention.

FIG. 5 is a block diagram showing a third embodiment of the invention. The illustration includes a film cartridge 1, a data disk 2 which is identical with the data disk of FIG. 1, and a lock member 3 which locks the data disk 2 to prevent the data disk 2 from accidentally moving. The lock member 3 is arranged to lock by rotating in the direction of arrow "a" and to unlock by rotating in the direction of arrow "b". Lock member unlocking means 9 includes a member 10 and is arranged to cause the member 10 to be coupled with the lock member 3 by lowering the member 10 and, after that, to render the data disk 2 rotatable with the lock member 3 caused to rotate by rotating the member 10 in the direction of arrow "b". Delay means 5 is arranged to delay a next action by a predetermined period of time. Film data reading means 6 is arranged to read data provided on the data disk 2. A detection element 7 is arranged to detect the data of the data disk 2 in the same manner as the detection element of the first embodiment shown in FIG. 1.

Figure 6:
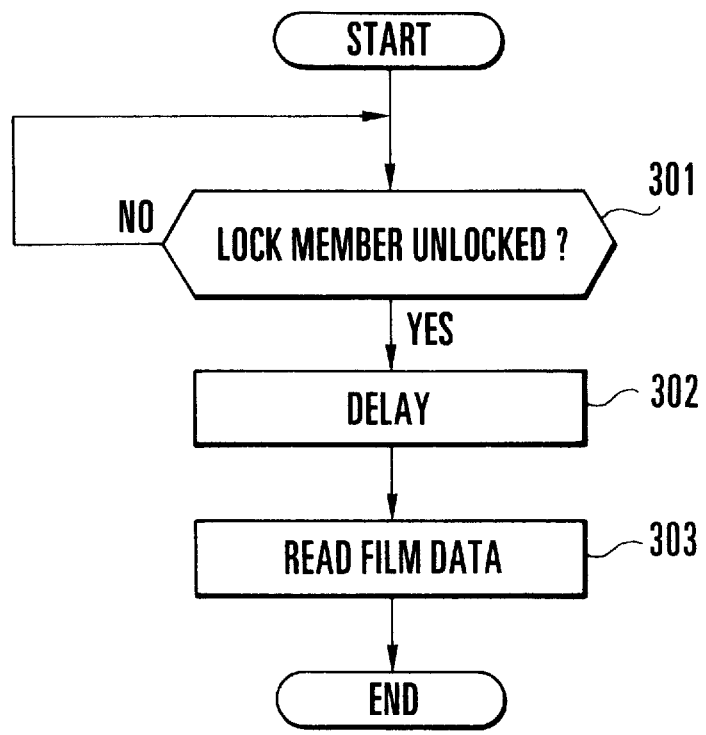
FIG. 6 is a flow chart showing the operation of the third embodiment shown in FIG. 5.

The arrangement of the third embodiment shown in the block diagram of FIG. 5 and described above operates as described below with reference to FIG. 6 which is a flow chart. When the film cartridge 1 is loaded, the cartridge loading action is detected in the same manner as in the case of the first embodiment shown in FIG. 1. At a step 301, the lock member unlocking means 9 acts to unlock the lock member 3 for the purpose of rotating the data disk 2. More specifically, the member 10 is moved down to be coupled with the lock member 3 and is then rotated in the direction of arrow "b". This action can be carried out, for example, by a motor arranged to control the descent and rotation of the member 10. At a step 302, the delay means 5 acts to provide a predetermined delay time. At a step 303, film data is read. The action of causing the data disk 2 to begin to rotate is carried out in the same manner as the first embodiment shown in FIG. 1.

A period of time necessary before the vibration of the data disk 2 caused by a shock of unlocking of the data disk locking member 3 comes to a stop can be secured by virtue of the arrangement and operation of the third embodiment described. Therefore, data provided on the data disk 2 can be stably and accurately read. Another merit of the third embodiment lies in that the arrangement and operation dispense with any absorbing mechanism that prevents the vibration from taking place when the lock member 3 is unlocked or a device for detecting the vibration of the data disk 2. This is a merit in terms of a reduction in cost and size.

FIG. 7 is a block diagram showing a fourth embodiment of the invention. The illustration includes a film cartridge 1, a data disk 2 which is identical with the data disk of FIG. 1, a lock member 3 arranged to lock and prevent the data disk 2 from accidentally moving, in the same manner as the lock member of FIG. 5, a lock member unlocking means 9 arranged to unlock the lock member 3 in the same manner as the lock member unlocking means of FIG. 5, a film data reading means 6 for reading data provided on the data disk 2, a storage means 11 which is a nonvolatile memory or the like arranged to store data even after a battery is removed, a display means 12, and a control means 13 which is a CPU or the like and controls the above-stated parts by means of a microcomputer. A motor 15 is arranged to cause the data disk 2 to rotate under the control of a motor driving means 14.

The fourth embodiment which is arranged as shown in the block diagram of FIG. 7 operates as described below with reference to FIG. 8 which is a flow chart.

At a step 401, when a predetermined timing is reached after the film cartridge 1 is loaded, the control means 13 controls and causes the lock member unlocking means 9 to couple the member 10 with the lock member 3 by pulling down the member 10. The lock member 3 is then unlocked by being rotated in the direction of arrow "b". These processes are carried out in the same manner as in the case of the third embodiment shown in FIG. 5. At a step 402, data indicative of the current operating conditions is read out from the storage means 11. In the case of this particular embodiment, this data indicates either a normal operating mode or a test mode in which a specific action is to be carried out.

At a step 403, the control means 13 reads the data stored and makes a check to find if the data indicates the normal operation mode or the test mode in which priority is given, for example, to curtailment of time. If the data is found not indicating the test mode, the flow of operation comes to a step 404. At the step 404, data for delay time, i.e., a period of waiting for stabilization of vibrations resulting from an unlocking action of the lock member 3, is read out from the storage means 11. At a step 405, the delay time thus found is set at a counter which is included in the control means 13. At a step 406, the timer is caused to start its time count and, at the same time, the display means 12 is caused to provide a display accordingly. At a step 407, a check is made for a lapse of the time set. After the lapse of the set time, the flow of operation comes to a step 408. At the step 408, the film data reading means 6 is caused to activate the detection element 7 for reading data from the data disk 2. Then the motor driving means 14 is controlled to cause the motor 15 to rotate. The motor 15 in turn causes the data disk 2 to rotate. The detection element 7 reads film data by detecting the bright-and-dark pattern of the data disk 2 according to its rotation.

If the data read out from the storage means 11 is found to indicate the test mode by the step 403, the flow jumps to the step 408 to promptly read out the film data by skipping the sequence of delay processes for the purpose of shortening the time.

The arrangement and operation described above enable, by software processes of the CPU such as a microcomputer or the like, the fourth embodiment to secure a period of time required for stabilization of the vibration of the data disk 2 resulting from the shock of unlocking of the lock member 3 for the data disk 2. Therefore, the film data can be accurately read out from the data disk 2. The arrangement of the fourth embodiment thus dispenses with any buffer mechanism that prevents the vibration from being caused by the unlocking of the locking member 3 or any device that detects whether or not the vibration of the data disk 2 has stabilized. This is another merit of the fourth embodiment in terms of a reduction in cost and size.

Since a test operation to be performed at the factory can be discriminated from a normal operation, the length of time required for a test per unit of the camera at the factory can be greatly shortened by skipping the period of time of waiting for stabilization of the data disk 2 resulting from unlocking of the lock member 3 with tools arranged to absorb vibrations and shocks. This is a great advantage in terms of cost. Further, the data to be read out by the above-stated step 402 is written into the storage means 11 when the test is conducted at the factory. Data for the normal operation mode is written in the storage means 11 at the time of shipment.

Further, with the waiting time for stabilization required in unlocking the lock member 3 arranged to be set by using data stored in the storage means 11, the possibility of giving a disagreeable feeling to the camera user by setting the waiting time at a relatively long period of time in general can be effectively eliminated.

A series of control processes and delay process to be carried out by the control means 13 according to the invention is not limited to the manner in which these processes are executed by the embodiment described. For example, control processes can be executed likewise to attain about the same advantageous effect in controlling the vibration and the positional deviation taking place when the camera is loaded with the film as shown in FIGS. 1 and 2 and also in securing a sufficient length of time for blocking external light as shown in FIGS. 3 and 4.

Further, the effect of the invention can be also attained with the delay time adjusted and computed by the control means 13. More specifically, the same advantage is attainable by adjusting the length of the delay time according to environment such as temperature and humidity.

While the embodiment described above is arranged to use a timer for the purpose of allowing the process of reading the film data of the film cartridge to begin after waiting for a lapse of a predetermined period of time after the film cartridge is stowed in the film cartridge chamber, the arrangement may be changed to allow the process of reading the film data to begin after waiting for completion of a predetermined operation to be executed by a microcomputer after the film cartridge is stowed in the film cartridge chamber.

Further, it is also possible to change the arrangement of the embodiment to allow the film data reading process to begin immediately after the film cartridge is stowed in the cartridge chamber and to process, as effective data to be set in information setting means, film data read out after a lapse of a predetermined period of time from the stowage of the film cartridge.

What is claimed is:

1. A camera adapted to stow a film cartridge having an information member provided with predetermined information, the information member being arranged to be movable with the rotation of a film feed spool by a drive source disposed in the camera, said camera being provided with a lock member for locking the rotation of the information member, comprising:

a) reading circuit for reading the information from the information member with the film cartridge stowed in a stowing part of the camera, said reading circuit being arranged to read the information while said information member is in a state of being driven by the rotation of said film feed spool in the film rewind direction;

b) a detection member for detecting the stowing of the cartridge in the stowing part;

c) a release member which operates in response to the detection that the stowing of the cartridge in the stowing part by the detection member to release the locking of the lock member;

d) a delay circuit which operates in response to the releasing operation of the release member; and e) reading control circuit for causing said reading circuit to begin to perform a reading operation after a lapse of a predetermined period of time defined by the delay circuit.

2. A camera according to claim 1, wherein the delay circuit is a timer.

3. A camera according to claim 1, wherein the information member is a bar-code disc.

4. A camera according to claim 1, wherein the information member is comprised of a bar code disk disposed perpendicular to an axis of the film cartridge.

5. A camera adapted to stow a film cartridge having an information member provided with predetermined information, the information member being arranged to be movable with the rotation of a film feed spool by a drive source disposed in the camera, comprising:

a) reading circuit for reading the information from the information member with the film cartridge stowed in a stowing part of the camera, said reading circuit being arranged to read the information while said information member is in a state of being driven by the rotation of said film feed spool in the film rewind direction;

b) reading control circuit having a first mode in which said reading circuit is caused to operate when a predetermined period of time has elapsed after the film cartridge is stowed and a second mode in which said reading means is caused to operate without waiting for a lapse of the predetermined period of time after the film cartridge is stowed; and c) selection means for selecting one of the first and the second mode.

* * * * *